United States Patent
Schuettel et al.

(10) Patent No.: US 6,761,517 B2
(45) Date of Patent: Jul. 13, 2004

(54) MOTORIZED SPINDLE

(75) Inventors: Patrick Schuettel, Roches (CH); Jacques Schnegg, Bévilard (CH)

(73) Assignee: Tornos SA, Moutier (CH)

(*) Notice: Subject to any disclaimer, the term of this patent is extended or adjusted under 35 U.S.C. 154(b) by 31 days.

(21) Appl. No.: 10/128,460

(22) Filed: Apr. 24, 2002

(65) Prior Publication Data

US 2002/0158541 A1 Oct. 31, 2002

(30) Foreign Application Priority Data

Apr. 25, 2001 (EP) .............................................. 01810410

(51) Int. Cl.⁷ .............................. B23C 1/00; B23Q 5/04; B23B 19/02
(52) U.S. Cl. ........................ 409/231; 409/141; 408/143; 408/238; 408/124; 310/51
(58) Field of Search .................................. 409/231, 232, 409/141; 408/239 R, 238, 143, 124; 451/178, 363; 82/147, 142; 310/51, 75 R, 112, 114

(56) References Cited

U.S. PATENT DOCUMENTS

| | | | | |
|---|---|---|---|---|
| 2,432,383 A | * | 12/1947 | Colwell | ..................... 310/51 |
| 3,752,019 A | * | 8/1973 | Kaneko | ..................... 82/142 |
| 4,167,218 A | * | 9/1979 | Horiuchi et al. | ........ 408/239 R |
| 4,815,903 A | * | 3/1989 | Skidmore, Sr. | ............ 409/231 |
| 5,088,362 A | | 2/1992 | Schalles | |
| 5,235,227 A | * | 8/1993 | Fazekas | ....................... 310/51 |
| 5,504,381 A | * | 4/1996 | Kato | ........................... 310/51 |
| 5,664,916 A | * | 9/1997 | Link et al. | .................. 409/231 |
| 5,850,770 A | * | 12/1998 | Rehage | ........................ 82/142 |

FOREIGN PATENT DOCUMENTS

| | | |
|---|---|---|
| EP | 0 235 019 A1 | 9/1987 |
| EP | 354496 A2 * | 2/1990 |
| EP | 0 440 096 A1 | 8/1991 |
| JP | 1-222840 A * | 9/1989 |
| JP | 8-85005 A * | 4/1996 |
| JP | 11-333601 A * | 12/1999 |

* cited by examiner

Primary Examiner—Erica Cadugan
(74) Attorney, Agent, or Firm—Oliff & Berridge, PLC

(57) ABSTRACT

A motorized device including a first element, a second element, a third element, a fourth element, and a fifth element, wherein in this device the fifth element is constructed around an elongated piece perforated by an axial channel, which elongated piece is referred to as a sixth element, an axial channel of the sixth element is of an inner diameter greater than an outer diameter of the first element such that an entire longitudinal axis of the sixth element is able to be engaged along the first element, at least one of the first element and the sixth element is equipped with a seventh element, the function of the seventh element is to ensure a coupling in rotation of the first and the sixth elements.

16 Claims, 4 Drawing Sheets

MOTORIZED SPINDLE

This invention relates to a motorized device known by the designation motorized spindle. The invention also relates to a machine tool equipped with at least one aforementioned device.

The devices of the aforementioned type comprise:
a first element which is made up of a tubular wall having two opposite ends, and has a channel and a longitudinal axis extending substantially axially with respect to the device,
a second element which, connected to one of the ends of the first element, is made up of a spindle nose, i.e. an element of coupling with a piece of equipment such as a mandrel,
a third element which, disposed about the first element, is made up of a means of guiding this first element in rotation about its longitudinal axis, and this relative to a fourth element intended to achieve a connection between the device and a support,
a fifth element which, situated around the first element, is made up of a means for driving the said first element in rotation.

The rotational guiding means is of a type allowing a very precise guiding of the spindle in rotation, and this within a very wide range of rotational speeds.

The manufacture of various parts of this rotational guiding means requires possession of special know-how, in addition to adapted tools.

The means for driving in rotation used in this context is also of a special type, and besides adapted tools, the manufacture of the different parts of this means for driving in rotation likewise requires special know-how.

The known devices of the aforementioned type are costly to manufacture because they require their maker to have at one and the same time a mastery of the art of manufacture of different parts of the electric motor and the art of manufacture of different parts of the rotational guiding means.

One object of the invention is to achieve a device the manufacture of which is not subject to this constraint.

To this end, the invention has as its subject matter a device of the aforementioned type, wherein in particular:
the fifth element is itself constructed around an elongated piece perforated by an axial channel, which elongated piece is referred to as the sixth element,
the axial channel of the sixth element is of an inner diameter greater than the outer diameter of the first element such that the said sixth element is able to be engaged along its longitudinal axis on the first element,
at least one of the elements, which are the first element and the sixth element, is equipped with a seventh element, the function of which is to ensure the coupling in rotation of the said first and sixth elements.

The invention also has as its subject matter a machining center equipped with at least one aforementioned device.

Figure 1:
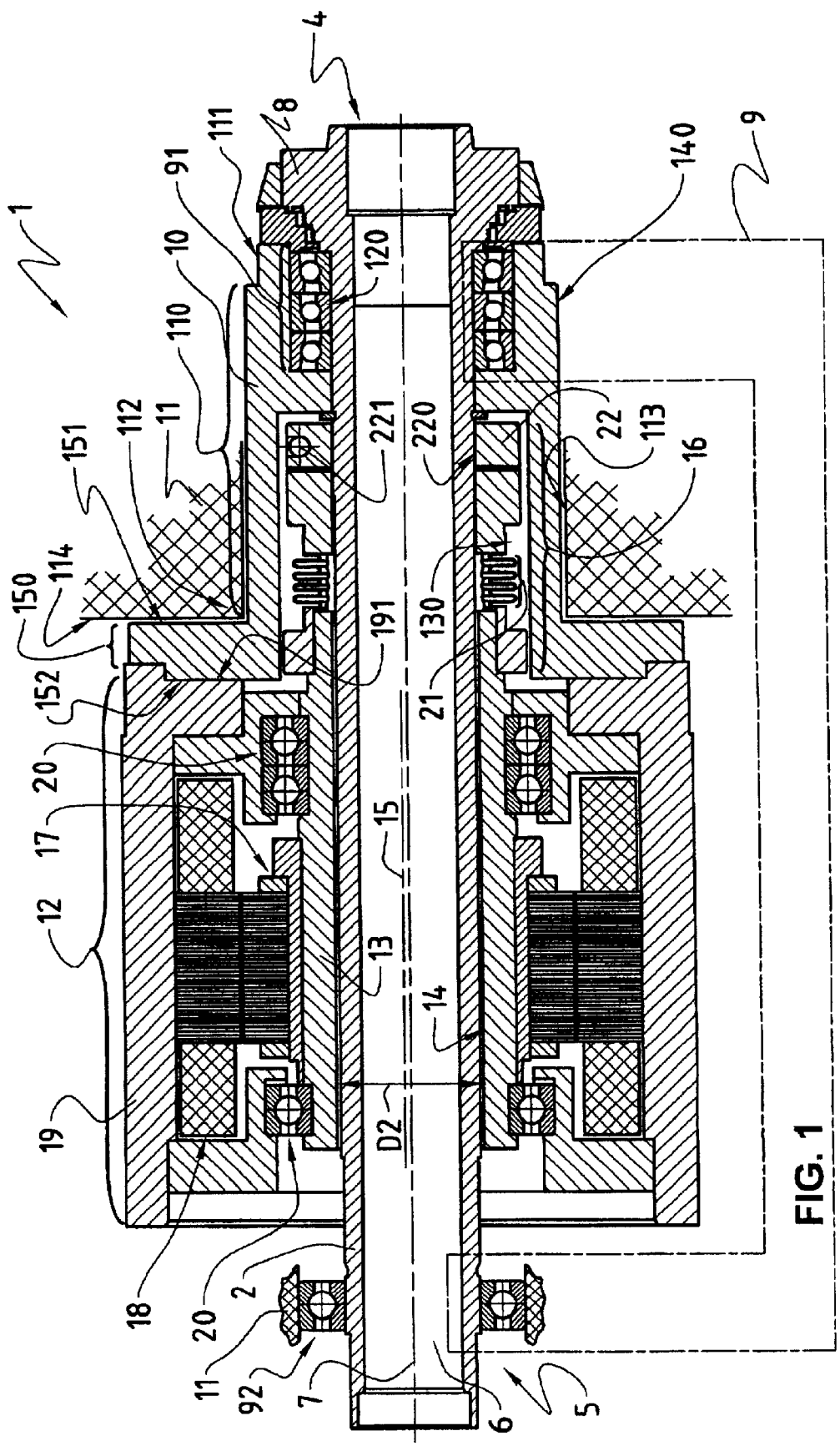
Figure 2:
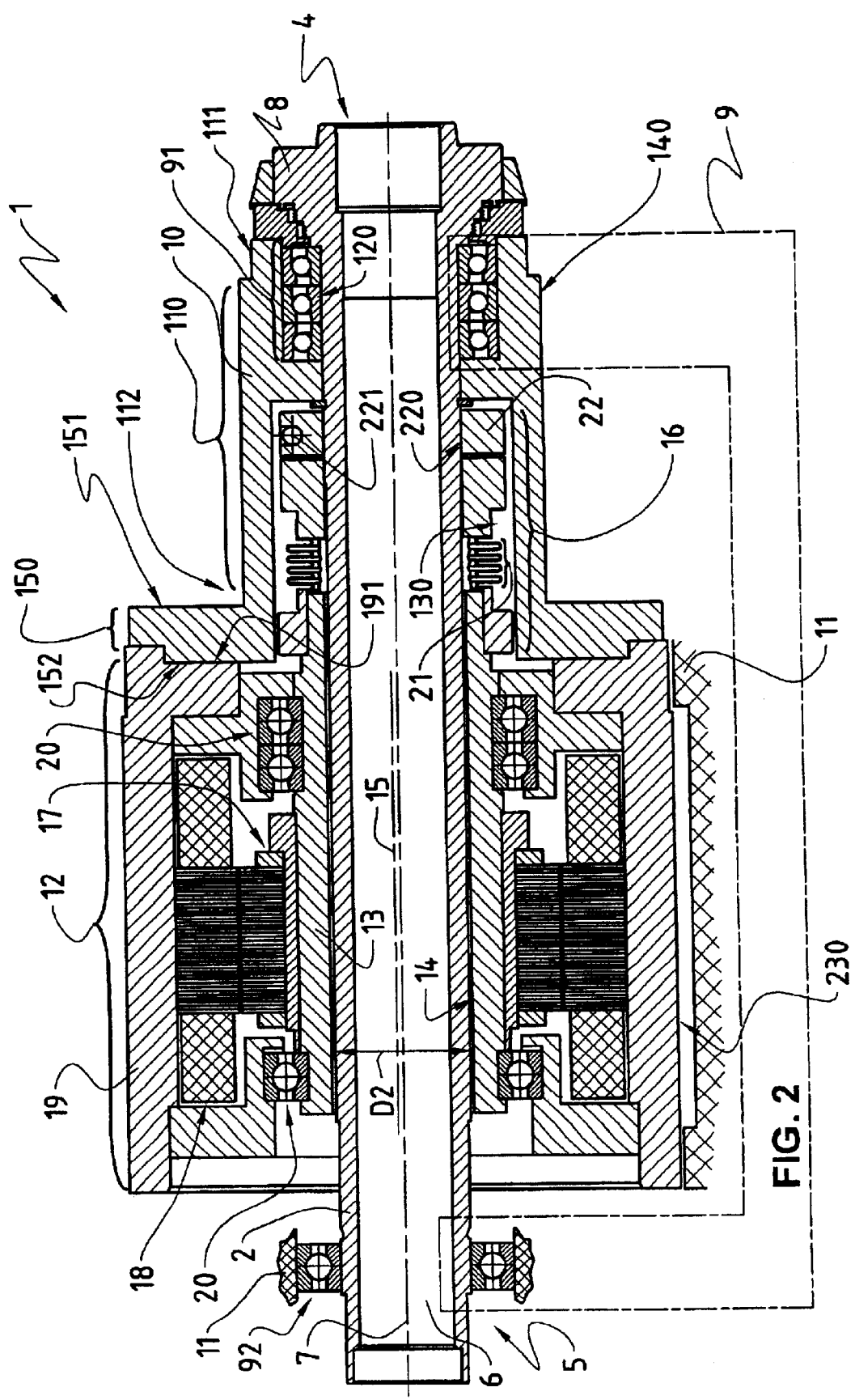
Figure 3:
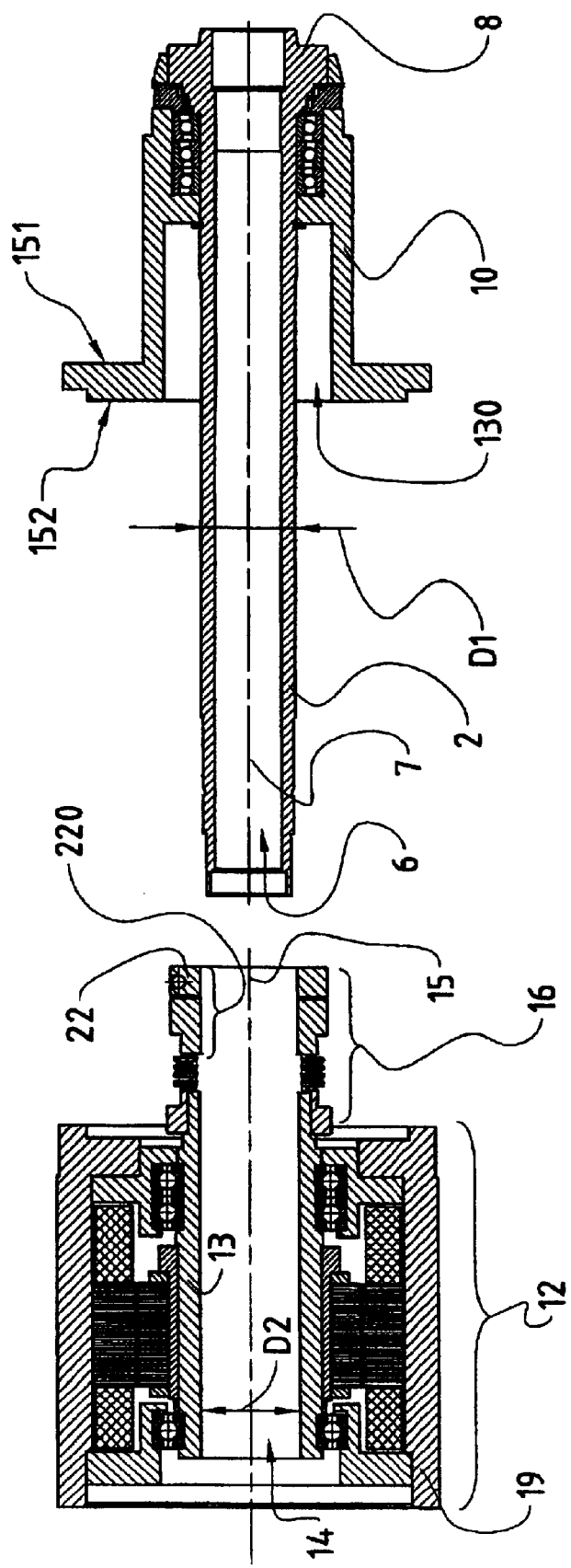
Figure 4:
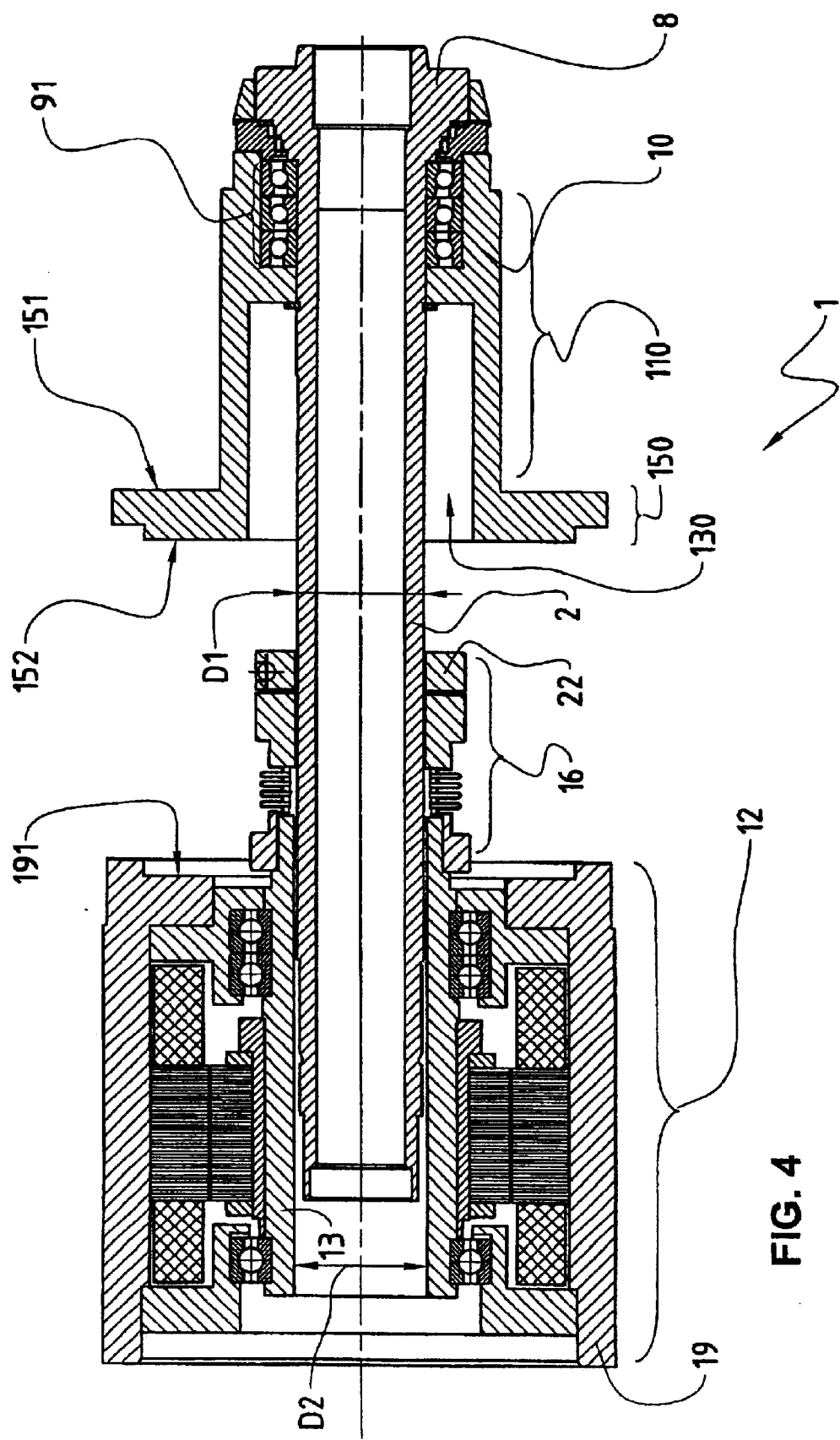

The invention will be better understood from reading the description which follows, given by way of non-limiting example, with reference to the attached drawing:

FIG. 1 shows the device according to the invention seen in a section along a longitudinal plane, FIG. 2 shows the device according to the invention according to an embodiment variant and seen in a section along a longitudinal plane, FIG. 3 shows the device of FIG. 1, seen in a section along a longitudinal plane and in the course of assembly, FIG. 4 shows the device of FIG. 1, seen in section in the disassembled state.

Referring to the drawing, a motorized device 1 can be seen comprising:
a first element 2 which is made up of a tubular wall 2 having two opposite ends 4, 5, and has a channel 6 and a longitudinal axis 7 extending substantially axially with respect to the device 1,
a second element 8 which, connected to one 4 of the ends 4, 5 of the first element 2, is made up of a spindle nose, i.e. an element of coupling with a piece of equipment such as a mandrel,
a third element 9 which, disposed about the first element 2, is made up of a means of guiding this first element 2 in rotation about its longitudinal axis 6, and this relative to a fourth element 10 intended to achieve a connection between the device 1 and a support 11 fixed with respect to rotation,
a fifth element 12 which, situated around the first element 2, is made up of a means for driving the said first element 2 in rotation.

The third element 9 which makes up the means of guiding the first element 2 in rotation about its longitudinal axis 6 is composed of a group of rolling bearings, for example, but the choice of exact type for this means is within the scope of knowledge of one skilled in the art, and is thus not described in detail.

In a noteworthy way:
the fifth element 12 is itself constructed around an elongated piece 13 perforated by an axial channel 14, which elongated piece 13 is referred to as the sixth element 13,
the axial channel 14 of the sixth element 13 is of an inner diameter D1 greater than the outer diameter D2 of the first element 2 such that the said sixth element 13 is able to be engaged along its longitudinal axis 15 on the first element 2,
at least one of the elements 2, 13, which are the first element 2 and the sixth element 13, is equipped with a seventh element 16, the function of which is to ensure the coupling in rotation of the said first 2 and sixth 13 elements.

It is thus understood that the fifth element 12 making up the means for driving the first element 2 in rotation is not constructed directly around the first element 2, but around a piece 13, which, referred to as the sixth element 13, is elongated and perforated by an axial channel 14 whose diameter is adjusted so as to allow engagement on the first element 2.

By adhering to these technical features, the device according to the invention can thus be structured in such a way that it is possible to divide up its manufacture without disadvantage and thus achieve the main object of the invention.

In a likewise noteworthy way, the fifth element 12 making up the means for driving the first element 2 in rotation consists of an electric motor comprising
a rotor 17 provided around the sixth element 13,
a stator 18 provided inside a housing 19 intended to be connected to a support 11,
members 20 which, referred to as members for guiding the rotor 17 in rotation in the housing 19 of the stator 18, are disposed at the level of each of the two opposite ends of the said rotor 17.

Compliance with these technical features likewise contributes to achieving the main object of the invention.

In a noteworthy way, on the one hand, the said first and sixth elements 2 and 13 fit together loosely, and on the other hand, the seventh element 16, the functions of which are to ensure the coupling in rotation of the said first 2 and sixth 13 elements, comprises an elastic piece 21 which makes it possible to ensure the transmission of a rotation movement between the sixth element 13 and the first element 2, and to absorb a difference in radial position between the longitudinal axes 7 and 15 of the said first 2 and sixth 13 elements.

The elastic piece 21 that makes it possible to ensure the transmission of a rotation movement between the sixth element 13 and the first element 2 consists preferably of a tubular metallic bellows.

This type of absorption element likewise makes it possible to absorb at least part of the vibrations generated by the means 12 for driving in rotation.

The seventh element 16, whose function is to ensure the coupling in rotation of the said first 2 and sixth 13 elements, preferably comprises a split ring 22 intended to be engaged on the first element and having for this purpose a boring 220, this ring 22 being:

equipped with at least one component 221 allowing it to contract in such a way that the surface of its boring 220 can be firmly applied to the first element 2, connected to the elastic piece 21 which makes it possible to ensure the transmission of a rotation movement between the sixth element 13 and the first element 2.

The component 221 allowing the split ring 22 to contract in such a way that the surface of its bore 220 can be firmly pressed on the first element 2, consists, for example, of a screw 221 whose head is accessible after fitting of the sixth element 13 on the first element 2.

The mechanical connection between the seventh element 16 and the sixth element 13 is likewise ensured, for example, by means of a split ring of the same type as the split ring which permits ensuring the connection with the first element 2.

These technical details are within the scope of knowledge of one skilled in the art.

In a way also noteworthy:

the third element 9, forming the means 9 for guiding in rotation, is formed by two parts 91, 92, a first 91 of which is able to determine locally an axial and radial position of the first element 2 and a second 92 of which is able to ensure locally a radial position of the said first element 2, the first part 91 of this means 9 for guiding in rotation is situated at the level of that end of the first element 2 which bears the second element 8, referred to as spindle nose, whereas the second part 92 of this guiding means 9 is situated at the level of the opposite end of the said first element 2, the seventh element 16, the function of which is to ensure the coupling in rotation of the said first 2 and sixth 13 elements, is likewise situated near the said first part 91 of the said third element 9.

With this structure, therefore, the motorized device according to the invention can be constructed in a relatively economical way and nevertheless have the qualities of particularly remarkable robustness and precision.

The proximity of the seventh element 16 and the first part 91 to the rotational guiding means 9 makes it possible to limit to the lowest possible value the transmission of vibration to the first element 2.

In a noteworthy way, the fourth element 10 intended to achieve a connection between the device 1 and a support 11 fixed with respect to rotation, comprises a tubular part 110 having two ends 111, 112, of which:

a first end 111 has an inner bearing area 120 for pressing and holding the first part 91 of the third element 9, forming the means 9 of guiding in rotation, an accommodation 130, situated substantially in the alignment of said inner bearing area 120 and in the vicinity of the second end 112 of the tubular part 110, the accommodation being intended to accommodate the seventh element 16 ensuring the function of coupling the said first 2 and sixth 13 elements in rotation, a second end 112 has a flange 150 which flange extends around an outer bearing area 140 for pressing and centering and has two opposite faces 151, 152, at least a first face 152 of which is intended to cooperate with a surface 191 which, provided on the housing 19 of the fifth element 12, comprises the means for driving the said first element 2 in rotation.

In a preferred embodiment, the fourth element 10, intended to achieve a connection between the device 1 and a support 11 fixed with respect to rotation, comprises a tubular part 110 having two ends 111, 112, of which:

a first end 111 has an inner bearing area 120 for pressing and holding the first part 91 of the third element 9, forming the means 9 of guiding in rotation, an accommodation 130, situated substantially in the alignment of said inner bearing area 120 and in the vicinity of the second end 112 of the tubular part 110, the accommodation being intended to accommodate the seventh element 16 ensuring the function of coupling the said first 2 and sixth 13 elements in rotation, an outer bearing area 140 for pressing and for centering in a complementary bearing area 113 provided by the fixed support 11, a second end 112 has a flange 150 which extends around the outer bearing area 140 for pressing and centering and has two opposite faces 151, 152, of which at least one face 152 is intended to cooperate with a first surface 191 which, provided on the housing 19 of the fifth element 12, constitutes the means for driving in rotation the said first element 2, a second face 151, itself oriented toward the first end 111 of the tubular part 110 and intended to cooperate with a second surface 114 provided on the fixed support 11.

According to another embodiment:

the fourth element 10, intended to achieve a connection between the device 1 and a support 11 fixed with respect to rotation, comprises a tubular part 110 having two ends 111, 112, of which:

a first end 111 has an inner bearing area 120 for pressing and holding the first part 91 of the third element 9, forming the means 9 for guiding in rotation, an accommodation 130, situated substantially in the alignment of this inner bearing area 120 and in the vicinity of the second end 112 of the tubular part 110, the accommodation being intended to accommodate the seventh element 16 ensuring the function of coupling the said first 2 and sixth 13 elements in rotation, a second end 112 has a flange 150 which extends around an outer bearing area 140 for pressing and centering and has two opposite faces 151, 152, at least a first face 152 of which is intended to cooperate with a first surface 191 which, provided on the housing 19 of the fifth element 12, constitutes the means for driving the said first element 2 in rotation, the said housing 19 of the fifth element 12 has at least locally a third surface 230 making it possible to ensure the pressing and the fixing to the fixed support 11.

The tubular part 110 preferably comprises a radial perforation (not shown) which is situated in such a way as to allow the maneuvering of the contraction component 221 of the split ring 22 after fitting of the sixth element 13 on the first element 2.

The device according to the invention of course includes components of assembly, in particular of the housing 19 and the flange 150, but since these components do not pose any problem for one skilled in the art with respect to choice and disposition, they have not been shown in order facilitate reading of the drawings.

What is claimed is:

1. A motorized device comprising:
a first element, which is made up of a tubular wall having two opposite ends, and has a channel and a longitudinal axis extending substantially axially with respect to the device,
a second element which, connected to one of the ends of the first element, is made up of a spindle nose,
a third element which, disposed about the first element, is made up of a means of guiding the first element in rotation about the longitudinal axis, and the third element being located relative to a fourth element intended to achieve a connection between the device and a support fixed with respect to rotation,
a fifth element which, situated around the first element, is made up of a means for driving the first element in rotation,
wherein in this device:
the fifth element is constructed around an elongated piece perforated by an axial channel, which elongated piece is referred to as a sixth element,
the axial channel of the sixth element is of an inner diameter greater than an outer diameter of the first element such that an entire longitudinal extent of the sixth element is able to be engaged along the first element,
at least one of the first element and the sixth element is equipped with a seventh element, the function of the seventh element is to ensure a coupling in rotation of the first and the sixth elements, and
the first and sixth elements fit together loosely, and the seventh element, the function of the seventh element is to ensure the coupling in rotation of the first and sixth elements, comprises an elastic piece that ensures a transmission of a rotation movement between the sixth element and the first element, and to absorb a difference in radial position between the longitudinal axes of the first and sixth elements.

2. The device according to claim 1, wherein the fifth element, making up the means for driving the first element in rotation, comprises an electric motor having
a rotor provided around the sixth element,
a stator provided inside a housing intended to be connected to a support,
members which, referred to as members for guiding the rotor in rotation in the housing of the stator, are disposed at a level of each of two opposite ends of the rotor.

3. Machining center equipped with at least one device according to claim 2.

4. The device according to claim 2, wherein:
the third element, forming the means of guiding the first element in rotation about the longitudinal axis, is formed by two parts, a first of which is able to determine locally an axial and radial position of the first element and a second of which is able to ensure locally the radial position of the first element,
the first part of the means of guiding in rotation is situated at a level of an end of the first element which bears the second element, referred to as the spindle nose, whereas the second part of the means of guiding is situated at a level of an opposite end of the first element, and
the seventh element, the function of the seventh element is to ensure the coupling in rotation of the first and sixth elements is situated near the first part of the third element.

5. The device according to claim 1, wherein:
the third element, forming the means of guiding the first element in rotation about the longitudinal axis, is formed by two parts, a first of which is able to determine locally an axial and radial position of the first element and a second of which is able to ensure locally the radial position of the first element,
the first part of the means of guiding in rotation is situated at a level of an end of the first element which bears the second element, referred to as the spindle nose, whereas the second part of the means of guiding is situated at a level of an opposite end of the first element, and
the seventh element, the function of the seventh element is to ensure the coupling in rotation of the first and sixth elements is situated near the first part of the third element.

6. The device according to claim 5, wherein the fourth element intended to achieve the connection between the device and the support fixed with respect to rotation, comprises a tubular part having two ends, of which:
a first end has a first bearing area for pressing and holding the first part of the third element, forming the means of guiding in rotation,
a second end has a flange which extends around a second bearing area and has two opposite faces, at least a first face of which is intended to cooperate with a surface which is provided on a housing of the fifth element, and
an accommodation, situated substantially in alignment with the first bearing area and in a vicinity of the second end of the tubular part, the accommodation accommodating the seventh element to ensure the coupling in rotation of the first and sixth elements.

7. Machining center equipped with at least one device according to claim 6.

8. The device according to claim 5, wherein the fourth element intended to achieve the connection between the device and the support fixed with respect to rotation, comprises a tubular part having two ends, of which:
a first end has a first bearing area for pressing and holding the first part of the third element, forming the means of guiding in rotation,
a second bearing area for pressing and for centering the fourth element in a complementary bearing area of the fixed support,
a second end has a flange which extends around a third bearing area and has two opposite faces, of which at least one face is intended to cooperate with a first surface which is provided on a housing of the fifth element, a second fare oriented toward the first end of the tubular part and intended to cooperate with a second surface provided on the fixed support, and an accommodation, situated substantially in alignment with the first bearing area and in a vicinity of the second end of the tubular part, the accommodation accommodating the seventh element to ensure the coupling in rotation of the first and sixth elements.

9. Machining center equipped with at least one device according to claim 8.

10. The device according to claim 5, wherein the fourth element, intended to achieve the connection between the device and the support fixed with respect to rotation, comprises a tubular part having two ends, of which:

a first end has a first bearing area for pressing and holding the first part of the third element, forming the means of guiding in rotation, a second end has a flange which extends around a second bearing area and has two opposite faces, at least a first face of which is intended to cooperate with a first surface which is provided on the housing of the fifth element, the housing of the fifth element has at least locally a second surface ensuring a pressing and a fixing to the fixed support, and an accommodation, situated substantially in alignment with the first bearing area and in a vicinity of the second end of the tubular part, the accommodation accommodating the seventh element to ensure the coupling in rotation of the first and sixth elements.

11. Machining center equipped with at least one device according to claim 10.

12. Machining center equipped with at least one device according to claim 5.

13. The device according to claim 1, wherein the seventh element, the function of the seventh element is to ensure the coupling in rotation of the first and sixth elements, comprises a split ring intended to be engaged on the first element and having for this purpose a boring, the split ring being:

equipped with at least one component allowing the split ring to contract in such a way that the surface of the boring can be firmly pressed on the first element, and connected to the elastic piece that ensures the transmission of the rotation movement between the sixth element and the first element.

14. The device according to claim 13, wherein:

the third element, forming the means of guiding the first element in rotation about the longitudinal axis, is formed by two parts, a first of which is able to determine locally an axial and radial position of the first element and a second of which is able to ensure locally the radial position of the said element, the first part of the means of guiding in rotation is situated at a level of an end of the first element which bears the second element, referred to as the spindle nose, whereas the second part of the means of guiding is situated at a level of an opposite end of the first element, and the seventh element, the function of the seventh element is to ensure the coupling in rotation of the first and sixth elements is situated near the first part of the third element.

15. Machining center equipped with at least one device according to claim 13.

16. Machining center equipped with at least one device according to claim 1.

* * * * *